R. E. FORD.
INSERTIBLE FITTING.
APPLICATION FILED DEC. 1, 1920.
1,367,312.
Patented Feb. 1, 1921.
2 SHEETS—SHEET 1.
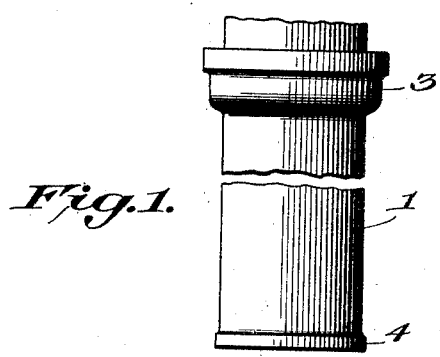
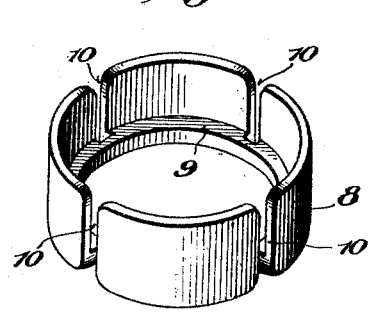
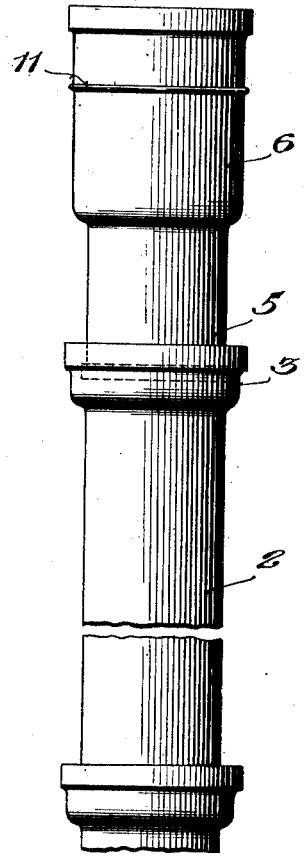
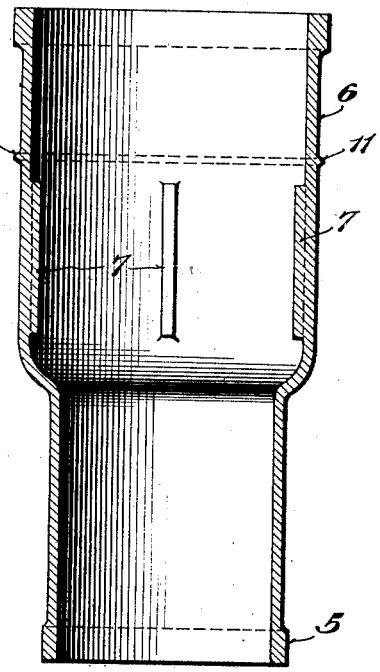
Inventor
Robert E. Ford,
By Cennleman, Bryant & Darby
Attorneys

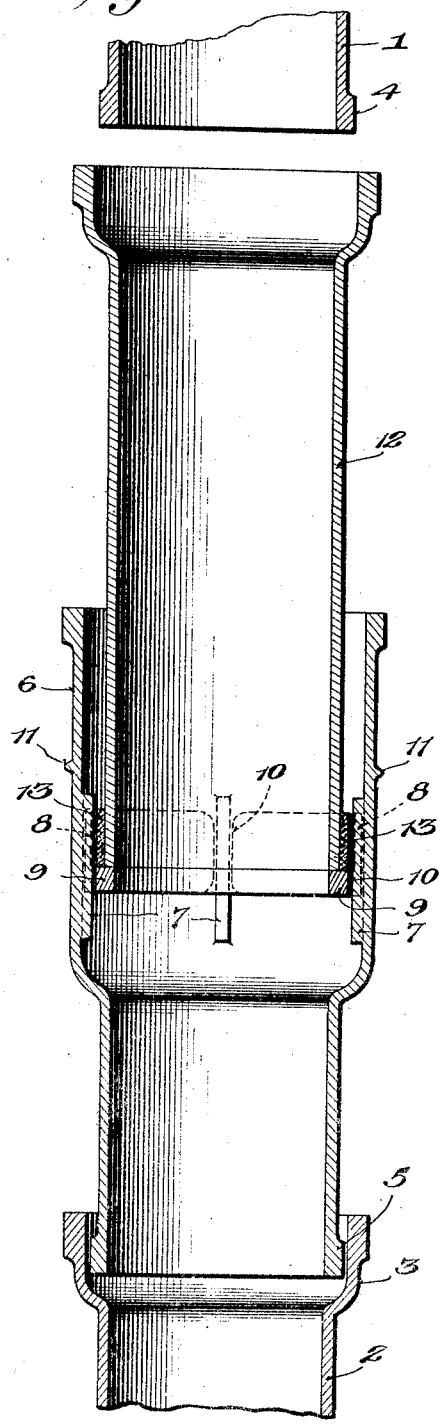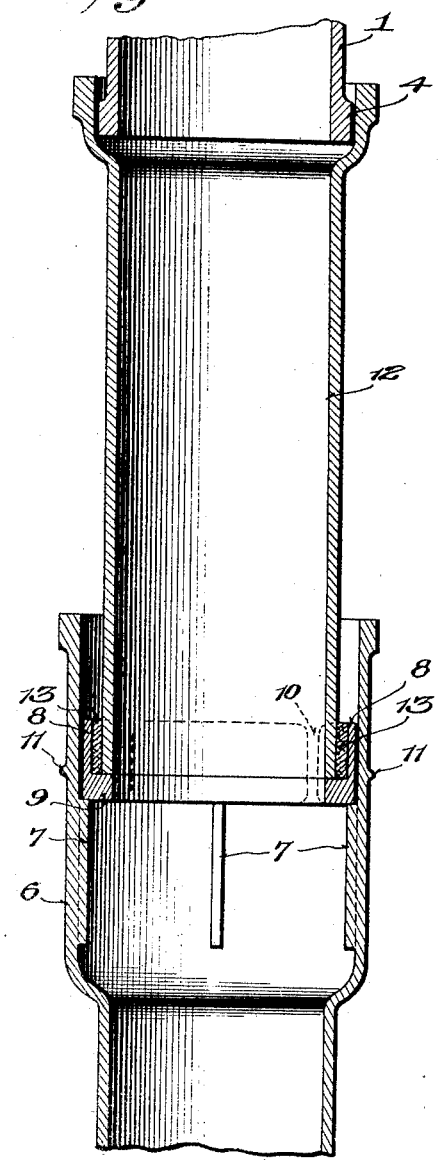

UNITED STATES PATENT OFFICE.

ROBERT E. FORD, OF BALTIMORE, MARYLAND.

INSERTIBLE FITTING.

1,367,312.  Specification of Letters Patent.  Patented Feb. 1, 1921.

Application filed December 1, 1920. Serial No. 427,523.

*To all whom it may concern:*

Be it known that I, ROBERT E. FORD, a citizen of the United States, residing at Baltimore, in the State of Maryland, have invented new and useful Improvements in Insertible Fittings, of which the following is a specification.

My invention relates to pipe couplings or fittings, and, more particularly, to a coupling or fitting intended for use in a line of pipe when it is found necessary, for any reason, to remove a length or section of pipe.

The invention is intended primarily, though not exclusively, for use in a line of pipe of the character generally employed for waste or soil-pipe in which each section is provided with a hub end and a spigot end, each hub end receiving the spigot end of its adjacent section.

It frequently becomes necessary to remove a section of soil or other pipes, as for the purpose of supplying a branch or where a section has become defective. In a line of pipe of the character above referred to, wherein the sections have telescoping ends, this, obviously, without a coupling or fitting of special construction, is a very difficult operation. I am aware of the fact that there have heretofore been devised, and are now in general use, several fittings or couplings of special construction intended for use in this connection. However, such fittings as are now employed are objectionable for the reason that when used they require the packing of a comparatively large number of joints, are comparatively expensive and of somewhat complicated structure.

It is an object of this invention to provide a fitting of this type which comprises a minimum number of small and inexpensive parts and which has a comparatively small number of joints.

Another object of the invention is the provision of a fitting which is of strong and durable character and is constructed so as to readily withstand the strain of supporting the superposed pipe sections.

A still further object of the invention is to provide means which will quickly indicate to the plumber the length to cut the new pipe-section that is to be installed.

The above, and other objects of a more minute character which will become obvious as the description proceeds, are attained by the use of a fitting comprising a member which preferably, though not necessarily, is constructed in a manner similar to the pipe-sections; that is, so as to have a hub end to receive the spigot end of a pipe section, and a spigot end to fit into the hub of an adjacent pipe-section. This member has located therein a supporting means, such as a plurality of ribs, for an upper pipe section. The fitting is also characterized by a collar adapted to fit within the above mentioned member and to be seated upon the interior supporting means, the collar being adapted to be secured to the end of an ordinary pipe-section and being provided with means for supporting the end of this pipe section.

In order to indicate to the one who is installing the fitting, the proper length to which the new pipe-section should be cut, some indicating means, such as a circumferentially extending rib, may be located upon the exterior of the fitting member in the same plane with the new pipe-section seat in the collar when it is inserted within the fitting member.

In the accompanying drawings there is illustrated one form of a device in which my invention may be embodied, and the same is shown as applied to a line of soil-pipe. In these drawings—

Figure 1 is an elevational view of a line of soil-pipe with parts broken away for a lack of space and showing one section removed and a portion of the improved fitting substituted therefor;

Fig. 2 is a perspective of a collar forming part of the fitting;

Fig. 3 is a longitudinal sectional view of the complementary fitting member;

Fig. 4 is a longitudinal section showing the fitting as it is being installed; and Fig. 5 is a view similar to Fig. 4 showing the final position of the various parts of the fitting.

Referring to the drawings, for a more detailed description, there is shown a line of soil-pipe comprising pipe-sections 1 and 2, each provided with a hub end 3 and a spigot end 4, the hub end of each section being adapted to receive the spigot end of the adjacent section. The sections 1 and 2, when the line of pipe is originally formed, are joined by a section similar to those indicated at 1 and 2. In the drawings this section is shown as removed, as frequently becomes necessary when it is desirable to substitute another section either for the purpose of supplying a branch or where the original section has become defective. It is in this connection that my improved fitting is intended to be used and reference will now be had to the construction of the several elements of the fitting.

Referring to Fig. 3, the fitting comprises a member which, like the several pipe-sections is preferably constructed with a spigot end 5 and a hub end 6, which may be somewhat longer than the hub end of the ordinary pipe-section. This member is, of course, a great deal shorter than a pipe-section and upon its interior should be provided with an upper pipe-section supporting means, which, in the illustrated embodiment of the invention, is shown as being in the form of a plurality of ribs 7 extending longitudinally of the member for a considerable distance. The ribs 7 are adapted to support a collar 8, which is securable to the spigot end of the new pipe-section that is to be inserted. The collar should be provided with a seat for the end of the pipe-section and in the drawings is shown as having an inwardly extending flange 9, which serves this purpose. Due to the fact that the pipe-sections have telescoping ends, it is necessary, when inserting the new pipe-section and the collar into the fitting, to project the collar and the spigot end of the pipe-section for a considerable distance into the fitting member so that the upper or hub end of the new pipe-section may be brought to a perpendicular position shown in Fig. 4, in which position it will be in alinement with the lower or spigot end of the pipe-section 1. In order to permit this movement the collar 8 has formed therein a plurality of grooves 10 corresponding in number to the ribs 7.

In applying this fitting the fitting member shown in Fig. 3 is first placed in the position shown in Fig. 1 with its spigot end projecting into the hub of the pipe-section 2. A new pipe-section will serve to connect this fitting member with the pipe-section 1, but, since the distance between the upper end of the fitting member and the pipe-section 1 is less than the distance between the pipe-sections 1 and 2, it is necessary that the new pipe-section be of less length than the usual or ordinary pipe-section. The one who is installing the fitting will obtain a new pipe-section of the proper length, preferably by cutting away a portion of the lower or spigot end of an ordinary pipe-section. To the end that the proper length of this new pipe-section may be readily determined, it is desirable that some permanent and unvariable indicating means be associated with the fitting. In the drawings there is shown located upon the exterior of the main fitting member such an indicating means, which is in the form of a circumferentially extending rib 11 upon the exterior wall of the fitting member. This rib should be located slightly above the upper end of the ribs 7 so as to be in the same plane with the face of the seating flange 9 when the collar 8 is inserted within the fitting member. The plumber, by measuring the distance from the lower end 4 of the pipe-section 1 to the rib 11, will determine the proper length for the new pipe-section.

Upon obtaining the new pipe-section, which is indicated in Figs. 4 and 5 by the reference character 12, the collar 8 is placed upon its lower or spigot end, which rests upon the flange 9. The collar will be secured to the spigot end of the new pipe-section 12, as by soldering 13, in order to insure against its accidental removal therefrom. The new pipe-section 12, with its collar, is subsequently brought to the position shown in Fig. 4 with the collar and end of the pipe-section telescoping into the hub end of the fitting member. The collar is first moved downwardly into the fitting member, its grooves 10 registering with the ribs 7 so that the collar may slide past the upper ends of the ribs, to bring the hub end of the new section 12 into its perpendicular position of alinement with the remainder of the pipe line. When the new section has reached the position shown in Fig. 4, it is then moved upwardly so that its hub end overlaps the spigot end of the pipe-section 1 and the collar and its surrounding fitting member are then relatively rotated so that the grooves and ribs are moved out of alinement and the collar thus supported upon the upper ends of the ribs. Obviously, when the final position, shown in Fig. 5, is reached the various joints are suitably packed in order to prevent leakage. It will be noted that when the fitting is assembled, as shown in Fig. 5, the collar flange 9 serves to support the new pipe-section 12, as well as the rest of the pipe line, and the collar 8 is seated upon the ribs 7. These ribs serve to reinforce the fitting member and also, because of the fact that they extend for a considerable distance longitudinally of the fitting member, are admirably adapted to sustain the strain of supporting the remainder of the pipe line. The line of this strain runs longitudinally of each rib, and, of course, along this line they are strongest.

It should be understood that the detailed showing and description is merely illustrative of the invention and should not be considered as at all restrictive thereof. The invention is, by no means, limited to the detailed features of construction shown and described, since, obviously, many modifications might be made in the illustrative structure without departing from the scope of the invention. For instance, it is not necessary that the particular rib and groove type of supporting means shown be employed, nor is it essential that the ribs be located upon the main fitting member and the grooves upon the collar 8, it being quite obvious that the arrangement might readily be reversed.

Having thus described the invention, what is claimed is:

1. An insertible fitting for a line of pipe, comprising a member adapted to have the end of a pipe section telescoped thereinto, a collar adapted to be placed upon the end of a pipe section to fit within said member and having a seat for said pipe section, said collar and said member having coöperating locking elements permitting movement of the pipe section and its collar into said member to bring the section into alinement with the pipe line and subsequent partial withdrawal of the section to complete the making and locking of the joint of the pipe section with the line of pipe.

2. An insertible fitting for a line of pipe comprising a member adapted to have the end of a pipe section telescoped thereinto, a collar adapted to be placed upon the end of a pipe section to fit within said member and having a seat for said pipe section, said collar and said member having coöperating groove and rib locking means permitting movement of the pipe section and its collar into said member to bring the section into alinement with the pipe line and subsequent partial withdrawal of the section to complete the making and locking of the joint of the pipe section with the line of pipe.

3. An insertible fitting for a line of pipe comprising a member adapted to have the end of a pipe section telescoped thereinto, a rib upon the interior of said member, a collar adapted to be secured upon the end of a pipe section to fit within said member, said collar having a seat for the end of said pipe section and provided with a groove to receive said rib to permit the collar to telescope into said member along said rib, said collar resting upon the end of said rib when the joint is completed.

4. An insertible fitting for a line of pipe comprising a member having a spigot end and a hub end, said hub end having upon its interior a plurality of ribs running longitudinally of the member, a collar adapted to encircle the spigot end of a pipe section and having an inwardly extending flange to seat the end of the pipe section and to prevent longitudinal movement of the collar thereon, and a plurality of grooves in said collar, whereby said pipe section and its collar may telescope into said member past said ribs, said collar resting against the end of said ribs when the joint is completed.

5. As an element of an insertible fitting, a collar adapted to be secured upon the spigot end of a pipe section having an inwardly projecting portion to form a seat for the end of a pipe section and a groove in its peripheral wall.

6. As an element of an insertible fitting, a collar adapted to be secured upon the spigot end of a pipe section having an inwardly projecting portion to form a seat for the end of a pipe section and a plurality of grooves in its peripheral wall.

7. As an element of an insertible fitting, a collar adapted to be secured upon the spigot end of a pipe section having an inwardly projecting flange to form a seat for the end of a pipe section and a plurality of grooves in its peripheral wall.

8. An insertible pipe fitting comprising a section having means located entirely therewithin to serve as a support for a pipe section, and independent means upon the exterior of said section indicating the position of the support within said section.

9. An insertible pipe fitting comprising a section having means located entirely therewithin to serve as a seat for a pipe section, and independent circumferentially extending means upon the exterior of said section indicating the position of the seat within said section.

10. An insertible pipe fitting comprising a section having means located entirely therewithin to serve as a seat for a pipe section, and independent means upon the exterior of said section located in the plane of said seat indicating the position of the seat within said section.

11. An insertible fitting comprising a member having a plurality of ribs upon the interior extending longitudinally thereof for a substantial distance and a member adapted to be connected to a pipe section and to fit into said first-mentioned member having a plurality of grooves permitting sliding movement past said ribs, said second-mentioned member being adapted for rotative movement within the other member so as to be supported upon said ribs.

12. An insertible fitting comprising a member having a plurality of ribs upon its interior, and a collar adapted to fit within said member and to be supported upon said ribs, said collar having a seat for the end of an ordinary pipe-section and having a plurality of peripheral grooves to permit the collar to slide along said ribs when being inserted into said member.

13. An insertible fitting comprising a member having a plurality of ribs upon its interior, and a collar adapted to fit within said member and to be supported upon said ribs, said collar having an inwardly projecting flange to serve as a seat for the end of an ordinary pipe section and having a plurality of peripheral grooves to permit the collar to slide along said ribs when being inserted into said member.

14. An insertible fitting comprising a member having supporting means therein, a collar adapted to fit within said member and to rest upon said supporting means, said collar having a seat for the end of an ordinary pipe-section and securable thereto, said collar having means thereon coöperating with said supporting means to permit sliding movement of the collar by the supporting means, and to permit the collar and its pipe-section to be supported when said collar and said member are given relative rotative movement.

In testimony whereof I have hereunto set my hand.

ROBERT E. FORD.